United States Patent [19]

Baumgartner

[15] 3,647,011
[45] Mar. 7, 1972

[54] SPEED AND STEERING CONTROL FOR VEHICLES
[72] Inventor: Darrell E. Baumgartner, Owatonna, Minn.
[73] Assignee: Owatonna Manufacturing Company, Inc., Owatonna, Minn.
[22] Filed: Apr. 13, 1970
[21] Appl. No.: 27,848

[52] U.S. Cl..............................................180/6.48, 74/491
[51] Int. Cl...........................................................B62d 11/04
[58] Field of Search..................180/6, 48; 60/53 R; 74/491

[56] References Cited

UNITED STATES PATENTS

| 3,461,669 | 8/1969 | Kanengieter | 60/53 R |
| 3,550,708 | 12/1970 | Paramythioti | 180/6.48 |
| 3,454,121 | 7/1969 | Toles | 180/6.48 |

Primary Examiner—Benjamin Hersh
Assistant Examiner—John A. Pekar
Attorney—Merchant & Gould

[57] ABSTRACT

Apparatus for controlling the speed and direction of movement of a vehicle using a pair of hydraulic drive units, each unit including an engine driven fluid pump and a cooperating fluid operated motor. Each motor is drivingly connected to one of a pair of laterally spaced drive wheels, steering of the vehicle being effected by a differential in speed between the drive wheels. A pivotal control lever is connected by linkage to speed and direction control arms on the drive units and pivotal and bodily movements are imparted to the lever, to control speed and direction of vehicle movement, by a speed control element and a steering wheel.

7 Claims, 10 Drawing Figures

INVENTOR.
DARRELL E. BAUMGARTNER
BY
ATTORNEYS

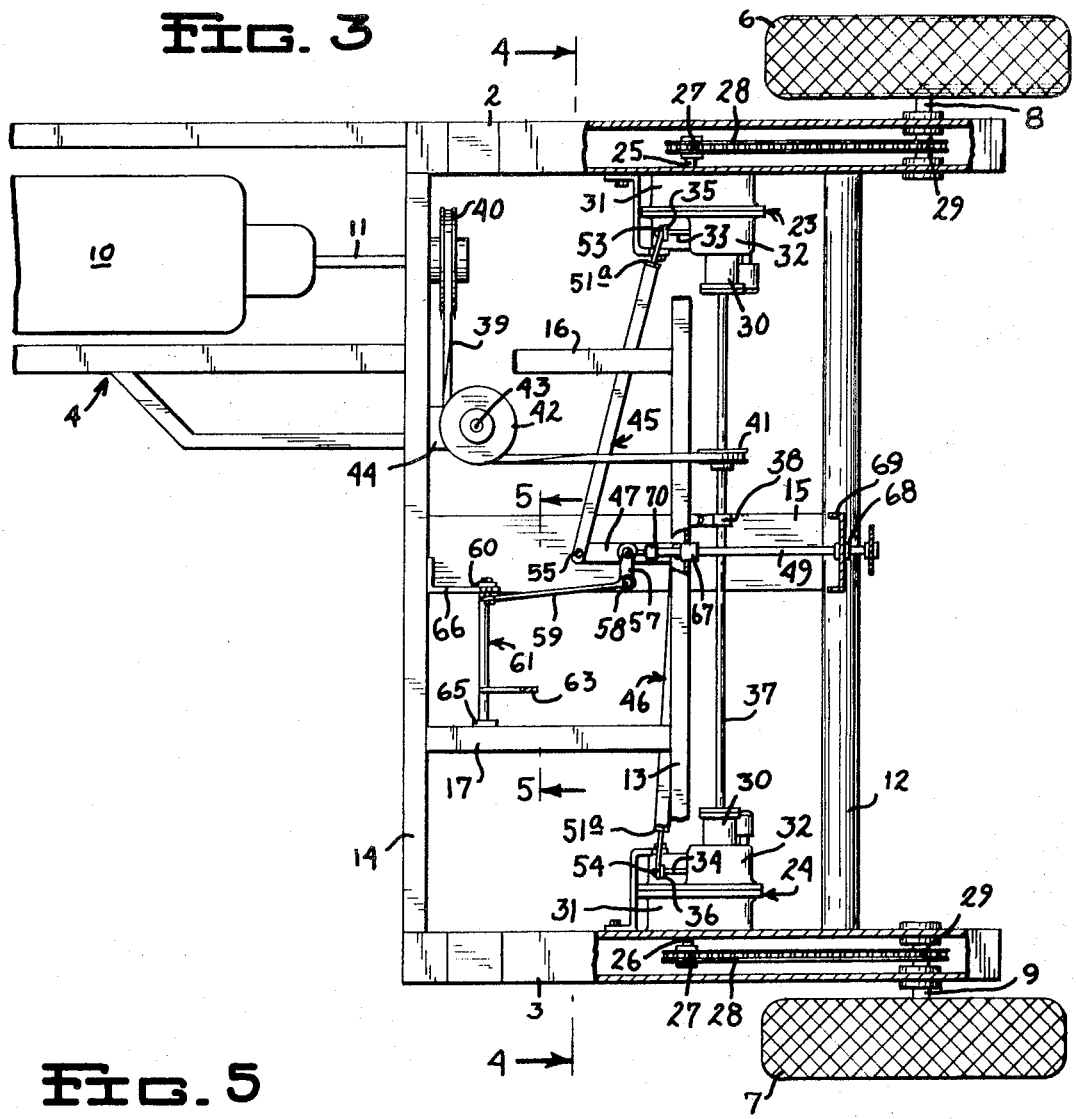

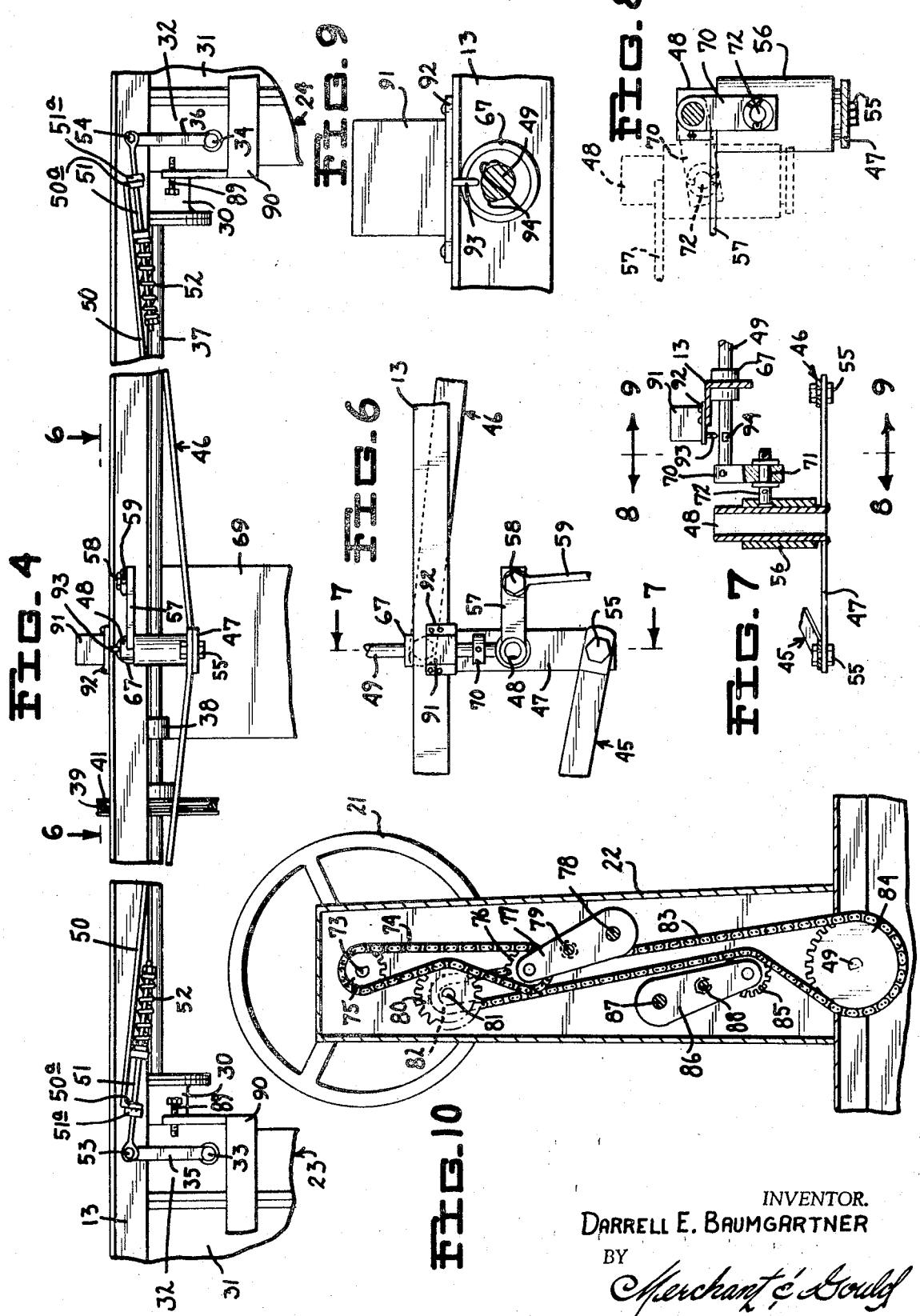

SPEED AND STEERING CONTROL FOR VEHICLES

BACKGROUND OF THE INVENTION

This invention is in the nature of an improvement on the structure disclosed in U.S. Pat. No. 3,461,669, issued Aug. 19, 1969 to Glenn G. Kanengieter, assignor to the assignee of this invention. In the vehicle of this patent and other generally similar fluid pressure driven vehicles, wherein driving and steering is achieved by driving independent rotary members at opposite sides of the vehicle at the same or different speeds, control of the fluid drive motors driving the rotary members is obtained by fluid pressure operated control devices or by mechanical means, many of which are expensive to produce and difficult to install and maintain in working condition and proper adjustment.

SUMMARY OF THE INVENTION

The present invention provides a highly simplified and effective control mechanism for a pair of fluid pressure drive units each of which drives one of a pair of traction elements at opposite sides of a vehicle, and includes a control lever disposed between the drive units and mounted for pivotal movements on a transverse axis intermediate its ends, and for bodily movements toward and away from each of the drive units alternately. Each drive unit includes a control arm moveable to control the speed and direction of rotation of its respective traction element, each control arm being connected to a portion of the control lever at an opposite side of the axis of pivotal movement of the control lever. The control lever is connected to a manually operated speed control element moveable in opposite directions from a neutral position to impart pivotal movements to the control lever whereby to control the speed of the vehicle between full forward, neutral and full reverse speed. Further, the lever is supported by a shaft journaled in a bearing, the lever, shaft and bearing being carried by a crank mounted on a steering shaft operatively connected to a steering wheel. The arrangement is such that rotation of the steering wheel in one direction imparts rotation to the crank to move the bearing, shaft, control lever and linkage generally away from one drive unit and toward the other thereof. Such movement effects a differential in speed or direction of rotation between the drive traction elements to impart steering movements to the vehicle. Further, when the speed control element is in a neutral position, or in a position to effect relatively slow vehicle speed, the steering wheel may be turned to cause one side of the vehicle to move forwardly and the opposite side rearwardly, to provide very sharp turning of the vehicle. The arrangement provides that, as the speed of the vehicle increases, the turning or steering radius of the vehicle also increases, thus adding a definite safety factor to the operation of the vehicle.

DESCRIPTION OF THE DRAWINGS

FIG. 3 is a fragmentary view corresponding to a portion of FIG. 1, some parts being broken away and some parts being shown in section;

FIG. 4 is a further enlarged fragmentary section taken substantially on the line 4—4 of FIG. 3;

FIG. 5 is an enlarged fragmentary section taken on the line 5—5 of FIG. 3;

FIG. 6 is a fragmentary detail in top plan, as seen from the line 6—6 of FIG. 4;

FIG. 7 is an enlarged fragmentary section taken on the line 7—7 of FIG. 6;

FIGS. 8 and 9 are fragmentary sections taken on the lines 8—8 and 9—9 respectively of FIG. 7; and FIG. 10 is an enlarged fragmentary section taken on the line 10—10 of FIG. 2.

DETAILED DESCRIPTION

Figure 1:
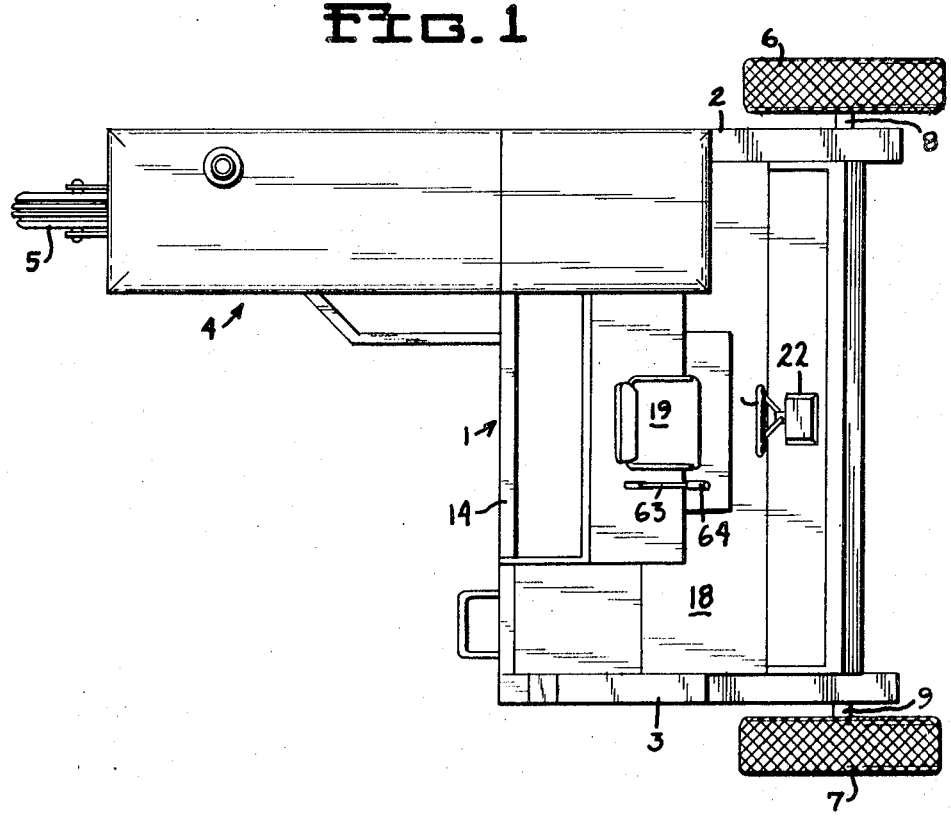
FIG. 1 is a view in top plan of a vehicle incorporating the control apparatus of this invention.
Figure 2:
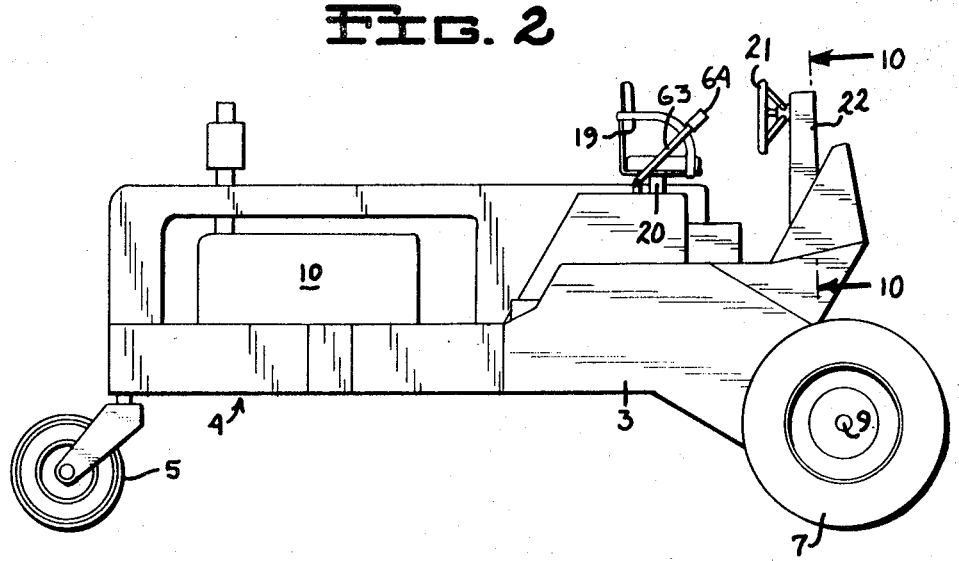
FIG. 2 is a view in side elevation.

A three-wheeled vehicle is shown in the drawings as comprising a generally rectangular frame 1 including a pair of laterally spaced forwardly and downwardly sloping hollow housings or legs 2 and 3, and a boom structure 4 extending rearwardly at one side of the frame 1 and supported at its rear end by a pneumatic tire-equipped caster wheel 5. The frame is further supported by a pair of drive wheels 6 and 7 that are mounted on respective shafts 8 and 9 journaled in respective ones of the housings or legs 2 and 3 at the lower forward end portions thereof. The vehicle is generally of the type disclosed in the above-identified Kanengieter patent and in U.S. Pat. No. 3,151,429, issued to Gorden Dyrdahl and assigned to the assignees of this invention, the frame 1 being adapted to carry agricultural implements, such as a swather, windrower, or other equipment not shown. As shown more or less diagrammatically in FIGS. 2 and 3, the boom structure 4 has mounted therein a conventional internal-combustion engine 10 having a forwardly projecting drive shaft 11. The frame 1 further includes a rigid tubular transverse frame member 12 secured at its opposite ends to the leg portions 2 and 3, other cross frame members 13 and 14 a generally central fore and aft extending frame member 15 connected at its front and rear ends to the frame members 12 and 14, and a pair of laterally spaced fore and aft extending angle irons or the like 16 and 17 extending between and secured to the frame members 13 and 14. The various frame members are preferably welded together to provide a rigid frame structure, the same being covered by a generally flat deck 18. An operator's seat 19 is mounted on a pedestal 20 extending upwardly from the deck 18, and is disposed directly behind a steering wheel 21 that is mounted on the rear side of a hollow supporting column 22.

The drive wheels 6 and 7 are independently driven by respective hydraulic drive units 23 and 24 having respective output shafts 25 and 26 on each of which is mounted one of a pair of drive sprocket wheels 27. Each of the sprocket wheels 27 has entrained thereover an endless link drive chain 28 that is also entrained over a respective one of a pair of sprocket wheels 29 each mounted fast on a different one of the wheel shafts 8 and 9, see FIG. 3.

The hydraulic drive units 23 and 24 are substantially identical, one thereof being right handed and the other thereof being left handed. The drive units 23 and 24 include fluid pressure pumps contained in housing portions 30 and fluid pressure operated motors contained in housing portions 31, suitable valve or like control mechanism being disposed within housing portions 32 including respective control shafts 33 and 34 having radially extended control arms 35 and 36 respectively mounted on the outer ends thereof. Drive units of the type shown at 23 and 24 are well known, usually each involving a fluid pump that supplies fluid under pressure to a cooperating fluid motor, both the pumps and motors being of variable displacement, whereby to vary the speed of the output shafts thereof. The units 23 and 24, shown in FIGS. 3 and 4, are manufactured by the Industrial Products Division of Cessna Aircraft Company of Hutchinson, Kansas, and each thereof are identified as Cessna Model 76100 Hydrostatic Drive.

The drive unit pumps, not shown, but disposed within the housing portions 30 are driven, preferably at substantially constant speed, from the engine drive shaft 11 by a transmission mechanism including a drive shaft 37 extending between the hydrostatic or drive units 23 and 24 and supported in suitable bearings, such as a bearing 38 mounted on the frame member 13. An endless flexible drive belt 39 is entrained over pulleys 40 and 41 mounted on the engine shaft 11 and pump shaft 37 respectively, and over a pair of mule pulleys 42, one of which is shown in FIG. 3, mounted on a shaft 43 supported by bracket means 44 welded or otherwise rigidly secured to the frame member 14.

Means for moving the control arms 35 and 36 in directions to control the speed and direction of travel of the vehicle comprises a pair of rigid links 45 and 46, a control lever 47, a rigid shaft 48 and a steering shaft 49. The links 45 and 46 each comprise inner and outer parallel link sections 50 and 51 respectively, the outer link sections being longitudinally slidably mounted on the outer end portions of the inner link sections 50 and yieldingly urged in a direction of sliding movement longitudinally inwardly relative to their respective inner link sections 50 by coil compression springs 52, see FIG. 4. The inward sliding movement of the link sections 51 is limited by engagement of stop nuts or collars 51a on the link sections 51 with abutment portions 50a on the ends of their respective inner link sections 50. The outer end of the outer link section 51 of the link 45 is pivotally connected to the outer end of the control arm 35, as indicated at 53, the outer end of the outer link section 51 of the link 46 being pivotally connected to the radially outer end of the control arm 36, as indicated at 54. The inner ends of the link sections 50 are each connected to an opposite end of the control lever 47 by nut-equipped pivot bolts or the like 55. The shaft 48 extends transversely of the control lever 47 and is rigidly secured thereto generally centrally between the pivot bolts 55, the shaft 48 being journaled in a tubular bearing 56, see particularly FIGS. 4, 6 and 7. A crank arm 57 is welded at its inner end to the upper end portion of the shaft 48, above the bearing 56, and extends radially outwardly therefrom, being pivotally connected, as at 58, to one end of a rigid link 59. At its rear end, the link 59 is pivotally connected to the radially outer end of an arm 60 of a bellcrank 61, the bellcrank 61 comprising an elongated shaft 62 and a second arm 63 that projects upwardly through a suitable opening in the deck 18 adjacent one side of the operator's seat 19, terminating in a handle 64. The shaft 62 of the bellcrank 61 is journaled in bearings 65, one rigidly secured to the frame member 17 and the other mounted on a brace member 66 welded or otherwise rigidly secured to the frame members 14 and 15, see particularly FIGS. 3 and 5.

The steering shaft 49 extends generally forwardly and rearwardly of the vehicle, and is journaled in spaced bearings 67 and 68 the former of which is rigidly secured to the cross frame member 13, the bearing 68 being mounted in a vertically disposed brace member 69 is welded or otherwise rigidly secured at its lower end to the tubular frame member 12 and which may be assumed to be welded at its upper end to a portion of the frame 1, not shown. A crankarm 70 has its radially inner end portion pinned or otherwise rigidly secured to the rear end of the steering shaft 49 and extends radially outwardly therefrom. Adjacent its radially outer end, the crankarm 70 is provided with an opening 71, the axis of which is parallel to the axis of the steering shaft 49, and in which is journaled a crankpin 72 that is rigidly mounted in the bearing 56 and which projects laterally outwardly therefrom.

With the above-described arrangement, it will be noted that the inner ends of the links 45 and 46, the control lever 47, shaft 48 and bearing 56 are all supported from the steering shaft 49 by means of its crank arm 70 and the crankpin 72 on the bearing 56. It will be further noted that, while a swinging movement of the handle-equipped bellcrank arm 63 in opposite directions imparts corresponding rotary or pivotal movement to the lever 47 on the axis of the shaft 48, rotary movement of the steering shaft 49 in either direction from a neutral position imparts bodily movement to the control lever 47 and links 45 and 46 in any position of pivotal movement of the control lever 47. Rotary movement is imparted to the steering shaft 49 from the steering wheel 21 by transmission mechanism including a steering wheel shaft 73 suitably journaled in the steering column 22 and secured to the steering wheel 21, an endless link chain 74 entrained over a sprocket wheel 75 mounted on the shaft 73 for common rotation therewith and an idler sprocket wheel 76 journaled on a bracket 77 pivotally mounted on a shaft 78 and held in a given position of adjustment by a screw 79. A sprocket wheel 80 keyed or otherwise secured to a shaft 81 suitably journaled in the column 22 for rotation on a fixed axis, engages the chain 74 to be driven thereby. A second sprocket wheel, shown by dotted lines in FIG. 10, and indicated at 82, is keyed or otherwise rigidly mounted on the shaft 81 and has entrained thereover an endless link chain 83 that is also entrained over a cooperating sprocket wheel 84 mounted fast on the front end of the steering shaft 49. The chain 83, like the chain 74, is maintained under proper tension by an idler sprocket wheel 85 mounted on an arm or bracket 86 that is journaled on a shaft 87 and held in place by a locking screw or the like 88. Mounting of the shafts 73, 78, 81 and 87 is conventional and well known, as is the locking of the arms or brackets 77 and 86 by their respective locking screws 79 and 88. The transmission mechanism shown in FIG. 10, in and of itself, does not comprise the instant invention. Hence, for the sake of brevity, further detailed showing and description thereof is omitted.

In the vehicle illustrated, the hydraulic drive units 23 and 24 are arranged so that the speed of the output shafts 25 and 26 thereof increases as the respective control arms 35 and 36 are swung inwardly toward each other and toward the center of the vehicle. A pair of adjustable stop screws 89 are screwthreadedly mounted in brackets 90 that are suitably secured to the frame 1, each of the stop screws 89 engaging a respective one of the control arms 35 and 36 to limit inward speed increasing swinging movements thereof. This arrangement provides a safety feature in operation of the vehicle, particularly during a change in direction of travel of the vehicle. When the vehicle is being driven at full forward speed and in a straight line, both control arms 35 and 36 are disposed in engagement with their respective stop screws 89. At this speed, turning of the steering wheel 21 in either direction will cause the crank arm 70 to be rotated to bodily shift the bearing 56 and control lever 47 toward a given one of the hydraulic drive units 23 and 24. Assuming that the steering wheel 21 is rotated to move the control lever 47 bodily toward the drive unit 24, the respective control arm 36 will be moved in a direction away from its respective stop screw 89 to reduce the speed of rotation of its respective drive shaft 26. The opposite control arm 35, being disposed against its respective stop screw 89, the coil spring 52 associated with the link 45 will be compressed, permitting lateral movement of the link section 50. Thus, with the output shaft 25 running at full speed and the output shaft 26 running at a reduced speed, the vehicle will turn in a clockwise direction with respect to FIG. 3. When the vehicle is at a standstill, the control arms 35 and 36 will be disposed substantially in their positions of FIG. 4. With the control arms 35 and 36 thus positioned, rotation of the steering wheel 21 will cause one of the control arms 35 and 36 to move in a direction to cause its respective output shaft 25 or 26 to rotate in a forward direction and the other thereof to rotate in a reverse direction, causing the vehicle to turn on its own axis. Obviously, at a standstill or at low, forward or reverse speeds, the further the steering wheel 21 is turned, the more rapid will be the turning speed. However, as the speed of the vehicle increases, the differential in speed between the shafts 25 and 26 decreases when the steering wheel 21 is rotated, particularly as one of the control arms 35 and 36 engages its respective stop screw 89.

As a safety feature to prevent the vehicle from being started when the steering wheel is in a spin turn position at either limit of its steering movement, an engine starting motor cutoff switch is provided, to be actuated by the steering wheel 21. This switch is indicated generally at 91 and is a normally open switch adapted to be interposed in the circuit of the starting motor, not shown, for the engine 10, the circuit not being shown. The switch 91 is mounted on a mounting bracket 92 which in turn is rigidly secured to the frame member 13 in overlying relation to the rear end portion of the steering shaft 49. As shown particularly in FIGS. 7 and 9, the switch 91 is provided with an actuator button 93 which lies in the path of travel of a cam 94 mounted on the steering shaft 49 and which is held in a switch closed position by the cam 94 when the steering wheel 21 is in its neutral position to direct the vehicle in a straightahead direction. When the steering wheel 21 is rotated to a predetermined extent away from its straingtahead steering position, the cam 94 becomes disengaged from the actuator 93, permitting the switch 92 to open to prevent starting of the engine.

From the above, it will be seen that I have provided a control apparatus for a hydrostatic drive mechanism, which control apparatus is extremely simple and inexpensive to produce, and which may be very easily serviced and adjusted; and, while I have shown and described a single embodiment of control mechanism, it will be understood that the same is capable of modification without departure from the spirit and scope of the invention, as defined in the claims.

What is claimed is:

1. Control apparatus for a hydraulic drive mechanism for a vehicle including a frame and a pair of rotary drive components at opposite sides of the frame, said drive mechanism including a pair of hydraulic units each comprising a pump portion and a motor portion, at least one of said portions of each unit being of variable displacement to vary the speed of said rotary drive components between full forward, zero speed, and full reverse, said units having individual control arms mounted thereon for movements between full forward, neutral or zero speed, and reverse drive positions, said apparatus comprising:
   a. a control lever;
   b. lever mounting means mounting said lever for pivotal movements on an axis extending transversely of the lever intermediate the ends of said lever and including a bearing member and a shaft member journaled in the bearing member, said shaft and bearing members being movable as a unit selectively in opposite directions generally transversely of the lever and said axis;
   c. linkage connecting portions of said lever at opposite sides of the axis of pivotal movement thereof each to a different one of said control arms;
   d. a crank arm operatively connected to said lever for imparting pivotal movement to said lever;
   e. a crankshaft journaled in said frame and having a second crank arm operatively connected to said control lever mounting means for supporting the same and for imparting said movements to the shaft and bearing members as a unit;
   f. a speed control member operatively connected to one of said crank arms to impart movements to said control lever in directions to vary the speed of said rotary drive components together and in the same direction;
   g. and steering control mechanism including a steering member carried by the frame and operatively connected to the other one of said crank arms to move said control lever in directions to vary the speed of said rotary drive components relative to each other, whereby to impart steering movements to the vehicle.

2. Control apparatus for a hydraulic drive mechanism for a vehicle including a frame and a pair of rotary drive components at opposite sides of the frame, said drive mechanism including a pair of hydraulic units each comprising a pump portion and a motor portion, at least one of said portions of each unit being of variable displacement to vary the speed of said rotary drive components between full forward, zero speed, and full reverse, said units having individual control arms mounted thereon for movements between full forward, neutral or zero speeds, and reverse drive positions, said apparatus comprising:
   a. a control lever element;
   b. lever mounting means mounting said control lever element for pivotal movements on an axis extending transversely of the control lever element intermediate the ends of said lever element and including,
      1. a bearing member;
      2. a shaft member journaled in said bearing member;
      3. a supporting crankshaft element journaled in said frame on an axis extending in a direction generally normal to the axis of said members.
      4. and a crank arm fixed on said supporting crankshaft element and having a radially outer end connected to one of said members to support and move said members as a unit selectively in opposite directions transversely of the axis of said members responsive to rotation of said supporting crankshaft element;
      5. said control lever element being fixed to the other of said members;
   c. linkage connecting portions of said control lever element at opposite sides of the axis of pivotal movement thereof each to a different one of said control arms;
   d. a speed control member carried by said frame and operatively connected to one of said elements to impart movements to said control lever element in directions to vary the speed of said rotary drive components together and in the same direction;
   e. and steering control mechanism including a steering wheel mounted on said frame and operatively coupled to the other of said elements to move said control lever element in directions to vary the speed of said drive components relative to each other, whereby to impart steering movements to the vehicle.

3. The control apparatus according to claim 2 in which said control lever element is rigidly fixed to said shaft member on the axis of pivotal movement of the control lever element, said crank arm being pivotally connected to said bearing member.

4. The control apparatus according to claim 2 in which said steering control mechanism is operatively coupled to said supporting crankshaft element for imparting rotation thereto.

5. The control apparatus according to claim 4 in which said control lever element is rigidly fixed to said shaft member on the axis of pivotal movement of the control lever element, characterized by a radially outwardly projecting crank arm on said shaft member, said speed control member being operatively connected to said last-mentioned crank arm for imparting rotation to said shaft member and control lever element.

6. The control apparatus according to claim 4, in which said pump portions are driven by an internal-combustion engine of the type having an electrical starting motor and a starter circuit therefor, characterized by a normally open switch disposed adjacent said supporting crankshaft and adapted to be interposed in the electrical starter circuit of said engine, and a switch operating element mounted on said crankshaft for common rotation therewith and engaging said switch to hold the same closed when the crankshaft is in a neutral position of rotation and responsive to rotation on said steering shaft crankshaft in either direction from said neutral position and to a predetermined angular extent to permit the switch to open.

7. The control apparatus according to claim 2 in which said linkage comprises a pair of links each connecting one of said control lever portions to a different one of said hydraulic unit control arms, each of said links including a pair of rigid elongated link sections having overlapping adjacent end portions in side-by-side longitudinal sliding engagement and outer ends pivotally connected to respective ones of said lever portions and control arms, characterized by stop means limiting movement of said control arms toward the full forward positions thereof, and yielding means urging the sections of each of said links in a direction to move their respective control arms toward the stop means associated therewith.

* * * * *